US007241245B2

(12) United States Patent
Stanovskoy et al.

(10) Patent No.: US 7,241,245 B2
(45) Date of Patent: Jul. 10, 2007

(54) GEAR-BEARING DIFFERENTIAL SPEED TRANSDUCER

(75) Inventors: Viktor Vladimirovich Stanovskoy, Tomsk (RU); Anatoly Fedorovich Shibiko, Tomsk (RU); Tatyana Andreevna Remneva, Tomsk (RU)

(73) Assignee: Joint Stock Company Tomsk Transmission Systems, Tomsk (RU)

( * ) Notice: Subject to any disclaimer, the term of this patent is extended or adjusted under 35 U.S.C. 154(b) by 76 days.

(21) Appl. No.: 10/482,893

(22) PCT Filed: Jul. 20, 2001

(86) PCT No.: PCT/RU01/00297

§ 371 (c)(1),
(2), (4) Date: Jun. 21, 2004

(87) PCT Pub. No.: WO03/008841

PCT Pub. Date: Jan. 30, 2003

(65) Prior Publication Data

US 2004/0242364 A1 Dec. 2, 2004

(51) Int. Cl.
*F16H 13/08* (2006.01)
(52) U.S. Cl. ...................................... 475/196
(58) Field of Classification Search ............... 475/196, 475/184, 183
See application file for complete search history.

(56) References Cited

U.S. PATENT DOCUMENTS 4,617,838 A * 10/1986 Anderson ............... 475/195

(Continued)

FOREIGN PATENT DOCUMENTS

EP         0 136 925    *  4/1985    ............... 74/813 R (Continued)

OTHER PUBLICATIONS

English translation of SU 1321965, Jul. 7, 1985.

(Continued)

*Primary Examiner*—Sherry Estremsky
(74) *Attorney, Agent, or Firm*—Moetteli & Associes SaRL

(57) ABSTRACT

The inventive differential (57) Abstract: The inventive differential rotation speed transducer can be used for drives of general use machines and mechanisms. Said transducer relates to gears provided with intermediate members and comprises a wave generator and a transferring unit which is embodied in the form of coaxial cages (1, 3, 4, 5) mated to each other around a circle. Clutch surfaces are embodied in the form of periodical roller ways interacting with a chain of balls (2) on each clip along the trace of said circle. The cage (1) is linked to the generator and embodied in such a way that it affects rolling bodies in the direction selected from any directions on the plane of the axial section of the transducer. The unit comprising four cages is used for transferring increased power. Spaced in azimuth grooves are embodied on two cages which are oppositely disposed with respect to the chain of balls and mechanically connected to each other.

Said unit being provided with greater number of cages, the additional links having other gearing ratios occur. A thin-wall separator provided with through grooves for displacing the rolling bodies can be introduced between the mating surfaces of the cages. Said separator is embodied in the form of an rotation surface provided with one or two reinforcing ribs and a swell arranged in the space between roller ways. The cage of the generator can be embodied in a coaxial form with respect to other cages and mounted in such a way that it is precessional. In order to extend the range of gearing ratios, the roller way disposed on the side surface of the cage is embodied in the form of a closed groove zigzagging in an axial direction.

17 Claims, 8 Drawing Sheets

U.S. PATENT DOCUMENTS

| | | | |
|---|---|---|---|
| 4,643,047 A | | 2/1987 | Distin et al. |
| 5,016,487 A | * | 5/1991 | Bollmann ................. 476/38 |
| 5,027,023 A | * | 6/1991 | Koivikko ................. 310/83 |
| 5,312,306 A | | 5/1994 | Folino |
| 5,514,045 A | | 5/1996 | Folino |
| 5,562,564 A | | 10/1996 | Folino |
| 5,577,423 A | | 11/1996 | Mimura |
| 5,600,999 A | | 2/1997 | Folino |
| 5,683,323 A | | 11/1997 | Imase |
| 5,722,910 A | | 3/1998 | Folino |
| 5,954,615 A | | 9/1999 | Folino |
| 5,989,144 A | | 11/1999 | Chen et al. |
| 5,989,145 A | | 11/1999 | Bursal et al. |
| 6,039,672 A | | 3/2000 | Bursal |
| 6,125,711 A | | 10/2000 | Bursal et al. |
| 6,250,267 B1 | * | 6/2001 | Methley ................. 123/90.17 |
| 6,253,720 B1 | * | 7/2001 | Lancefield et al. ...... 123/90.17 |
| 2005/0250617 A1 | * | 11/2005 | Sagawa ................. 476/40 |

FOREIGN PATENT DOCUMENTS

| | | |
|---|---|---|
| JP | 60129462 | 7/1985 |
| RU | 559052 | 5/1977 |
| RU | 825823 | 4/1981 |
| RU | 2019760 | 9/1994 |
| RU | 2029167 | 2/1995 |
| RU | 2029168 | 2/1995 |
| SU | 1025941 | 6/1983 |
| SU | 1216498 | 3/1986 |
| SU | 1276869 | 12/1986 |
| SU | 1321965 | 7/1987 |
| SU | 1348586 | 10/1987 |
| SU | 1359524 | 12/1987 |
| SU | 1019148 | 4/1988 |
| SU | 1511495 | 9/1989 |

OTHER PUBLICATIONS

English translation of SU 1348586, Oct. 30, 1987.
English translation of SU 1359524, Dec. 15, 1987.
English translation of description and claims of SU 1019148, Apr. 30, 1988.
English abstract of JP 60129462, Jul. 10, 1985.
English translation of description and claims of SU 1216498, Mar. 7, 1986.
English translation of description and claims of SU 1025941, Jun. 30, 1983.
English translation of description and claims of SU 1511495, Sep. 30, 1989.
English translation of description and claims of SU 1276869, Dec. 15, 1986.
English translation of description and claims of RU 2019760, Sep. 15, 1994.
English translation of description and claims of RU 559052, May 25, 1977.
English translation of description and claims of RU 2029168, Feb. 20, 1995.
English translation of description and claims of RU 825823, Apr. 30, 1981.
Boiko, L.S., et al. "Reducers and Motor Reducers of General Use Engineering Industry", Moscow: Mashinostroyenie, 1984. pp. 22-29. English translation.
Ignatishchev, R.M. "General Information of Sinusoidal Ball Drives", Bulletin of Engineering Industry, (1986), No. 2, pp. 24-28. (English translation).
Pashkevich, M.F. "Face ball reducers and their kinematics", Bulletin of Mechanical Engineering, (1985) No. 7, pp. 23-26. (English translation).
Ignatishchev, R.M. "Three-sinusoidal ball gears", Buletin of Mechanical Engineering, (1987), No. 2, pp. 13-16. (English translation).

* cited by examiner

GEAR-BEARING DIFFERENTIAL SPEED TRANSDUCER

BACKGROUND OF THE INVENTION

1. Field of the Invention

The invention relates to motion transmitting devices with speed conversion and can be used for drives of general use machines and mechanisms. Said transducer relates to wave gears provided with intermediate members.

2. Description of the Related Art

The wave tooth gear is known (see "Reducers and motor—reducers of general use. engineering industry". Reference book/L. S. Boyko, A. Z. Visockyi and others.—M: Mashinostroyenie, 1984, pp. 22–29; RU No. 2019760). In general this gear consists of three basic members, which are: rigid tooth wheel, flexible tooth wheel and wave generator. Said wave tooth gears having the high transmission ratio (up to 1:350 for one step), however have low efficiency caused by losses of energy to deformation of flexible wheel and to friction between engaged teeth.

Friction between engaged teeth and losses of energy to deformation of flexible wheel are eliminated in wave gear with intermediate members, which are rolling elements. Here, a file of rolling elements (balls or rollers) serves as a flexible wheel of traditional wave gear. Radial wave gears with intermediate rolling members are described in patents RU 2029167, RU 2029168, U.S. Pat. No. 5,989,144. In said gears the wave generator being a cam produces a wave of radial moving to a file of balls. Devices in which wave generator is eccentric rotating disc or idler located on crankshaft and driven in rotation by said crankshaft, also relate to this type of transducers. Eccentric rotating disc or idler in said devices has cam side surface formed as a tooth profile with a radial direction of teeth (patents U.S. Pat. No. 4,584,904, U.S. Pat. No. 4,643,047, U.S. Pat. No. 5,683,323). Said speed transducers like to all mechanisms with eccentric members have asymmetric loading to shaft thereby causing beating and the increasing deterioration of details unless to apply balancing elements. In axial wave transducers with intermediate members the wave generator forces a file of rolling members (balls) in an axial direction. Such transfers may refer to as differently and have some differences in their designs (SU 559052, SU 1025941). Their general disadvantage is that balls during operating periodically lose continuous rolling contact resulting in significant decreasing in operating efficiency.

There are known so-called Sinusoidal Ball Drives which also can be related to wave gears with intermediate members (Ignatishchev R. M. <<General Information on Sinusoidal Ball Drives>>, <<Bulletin of engineering industry>>, 1986, No. 2, pp. 24–28). In cited article designs of "two-sinusoidal" and "three-sinusoidal" gears are offered in which no whole cam participates in eccentric movement but only rolling bodies that considerably reduces asymmetric of loading. A motion transmitting unit of "two-sinusoidal" gear consists of three in series members. Two outer members provided with cam surfaces in form of a groove defined by periodic curve on an azimuth. The intermediate member has openings for balls and carries out the function of planet carrier and a separator simultaneously. One of members with a cam surface is the wave generator. The groove of the wave generator may be either singly-periodic or multiperiodic. Proportion of the cam surfaces periods are depending upon number of rolling elements and submitting to the certain law. This principle is realized both for radial and for axial wave transfers. For radial "two-sinusoidal" gear there are developed several specific kinematics. Periodic grooves with a radial direction of a bend are executed on flat surfaces of disks faced each other, and a cage is realized as a flat ring with radial slots is located between them (see also SU 1019148, Ignatishchev R. M., the Mogilyov machine-building institute, 30.04.88). Weight imbalance in such gear is reduced, and it matters only for gears with the high torque because of large ball sizes.

For axial "two-sinusoidal" gear there is developed one kinematics (see also SU 825823, the same applicant, 30.04.81). A motion transmitting unit comprises three coaxial nested members. Cam surfaces are executed as periodic grooves with axial direction of bend on lateral surfaces of external and internal members faced each other, and the intermediate member has through longitudinal slots.

To increase the gear ratio the same author had developed, so-called, "three-sinusoidal" gear with axial moving balls (SU 1216498, 07.03.86). Periodic in an azimuth direction grooves are formed in each of members. For this purpose the intermediate cage is connected to the housing since periodic groove on it is through circular groove.

The designs patented by firm Synkinetics, Inc.(U.S. Pat. No. 5,312,306, U.S. Pat. No. 5,514,045, WO 94/18472, U.S. Pat. No. 5,562,564, U.S. Pat. No. 5,600,699, U.S. Pat. No. 5,722,910, U.S. Pat. No. 5,954,615, U.S. Pat. No. 5,989,145, U.S. Pat. No. 6,039,672, U.S. Pat. No. 6,125,711) and also the patent of U.S. Pat. No. 5,577,423 relate to "two-sinusoidal" gears. In the above speed transducers is realized a principle sinusoidal—ball gear above described.

Thus, sinusoidal-ball gears have the following advantages: high reduction ratio with compact structure, simplicity of a design and small dimensions at the high torque. A principle of configuration of motion transmitting unit of the converter, fixed in a basis of all above described designs, is closest to the offered invention. But setting-up of described design configurations of three consistently located details limits number of constructive variants of performance since the intermediate detail, namely separator, necessarily should have through slots. In such design depth of grooves and thickness of the separator are approximately equal each other and are $\frac{1}{3}$ of rolling body diameter. The analysis of loads exerted on a ball shows that the force acting on a ball from grooves do not pass through the center of a ball and consequently have two components: radial and axial, thus only one of them performs useful work, and another only increases losses of energy by friction. Furthermore the points of application of these forces are edges of grooves that do not allow realizing point-to-point contact of balls to grooves. It causes the raised deterioration of balls and destruction of grooves in their edges by transfer of the high torque. As marked in article (Pashkevich M. F. The bulletin of mechanical engineering, 1985, No. 7, pp. 23–26), the weakest on durability a part of sinusoidal-ball gear is a cage. Increasing its thickness is impossible because of the point of application of the force on a ball is displaced from the center toward edge and useful component of force is decreased.

As a prototype of gear with radial wave moving balls is chosen planetary three-sinusoidal gear (SU 1276869, 15.12.86) which represents the speed transducer realizing a principle of wave gear with intermediate rolling bodies. Torque transmitting unit of this speed transducer consists of three disks at least two of which are coaxially each other. One of disks is connected to the wave generator and is driving member in this gear. Each of disks has a cam surface in the form of closed periodic groove bent in a radial direction and continuously contacting balls. The grooves of two disks are located on the surfaces faced to each other, and the groove of intermediate disk is located on its side surface. In the one of embodiments, in order to decrease slippage of ball, the wave generator's disk is connected to shaft through crankshaft, and a groove on it is annular groove. Torque transmitting unit of this mechanism is not mass balanced since balls are on different distances from an axis of rotation. Unbalance is even more increased in embodiment with crankshaft; therefore it loses the general advantage of sinusoidal-ball gear. In order to obtain high loading abilities it is necessary to apply special means of mass balancing, such as special cut at the bottom of a groove (see SU 1511495, 30.09.89.) or a v-shaped slot in eccentric disk. Furthermore to this "three-sinusoidal" gear all conclusions concerning to points of the application of forces and to the raised deterioration of balls and to destruction of groves made above are fair. Later the design of this "three-sinusoidal" gear was modified, since it was found out, that balls while follow simultaneously between crests and hollows troughs along of three grooves may deviate from the average angular positions thus causing deterioration of dynamics and even jamming in driving engagement. In order to eliminate these disadvantages, addition thin-walled cage with radial slots is entered between disks of torque transmitting unit which cage fixes balls at equal angular spaces from each other while they passage the critical points (see Ignatishchev R. M. "Three-sinusoidal ball transfer the Bulletin of mechanical engineering", 1987, $^1$2, pp. 13–16). Such cage is no torque transmitting member, i.e. is non-loaded. At the same time, presence of the cage even more displaces points of application of forces acting to ball from an axis which pass through the centre of a ball, and thereby worsens distribution of forces.

It is an object of the present invention to provide a speed converter which is simplified in nature but is robust in transmission capability. It is a further object of present invention to provide speed converter design which is self-contained and multi-purpose similar to a bearing and which is adaptable to variety of situation. Invention results in development of the generalized basic design on basis of which it is possible to provide the various embodiments possessing general advantages: more compact and constructed of a minimum number of parts for its load rating, weight balanced, optimized load sharing among the torque transmitting elements, and also minimally possible useful volume of the torque transmitting unit allowing to use bearing seal and lubrication for life. On basis this design it is possible to develop a mechanism with the raised loading ability caused by of two-point contact of rolling bodies with grooves. The invention expands variety of designs and functions of wave gears thereby allowing to easily adapt the converter for any service conditions and to build it in the most various mechanisms. Speed converter according to the invention may carry out function of both a reducer and a multiplicator. Furthermore, speed reducer according to the invention is able to have with single input two ore more outputs or it is able to variable output in dependence of ratio of two inputs, and all these functions are realized in single torque transmitting unit, i.e. at one stage.

SUMMARY OF THE INVENTION

In accordance with the present invention differential speed transducer on basis of wave gear with intermediate rolling bodies just as the prototype comprises the wave generator and torque transmitting unit with a file of rolling bodies. Torque transmitting unit includes some members, each of which has a cam surface in the form of closed periodical groove. Said rolling bodies are in constant and simultaneous contact with grooves of all members. One member is connected to the wave generator, at least, one of other members has periodically bent closed groove. In contrast to the prototype, transmitting unit contains at least three nested members embodied in the form of coaxial cages related to each other so that each of members is conjugated with two adjacent, and at least two of members are conjugated at the intersection of their surfaces. Periodic grooves are located in a locus of intersecting of these surfaces. The member connected to the wave generator forces rolling bodies in a direction chosen from any directions in a plane of axial section of the transducer. The closed periodically bent grooves of other members are made with the direction of a bend coincident with a direction of said forcing of the wave generator. In order to obtain constant and simultaneous contact rolling body with all grooves the bend amplitude of grooves at such arrangement of members should be less then radius of rolling bodies. In such configuration of torque transmitting unit all cages are conjugated with each other around of a file of balls, thereby forming by theirs grooves cavities for balls. Thus, by choosing a direction of forcing of wave generator depending on a relative positioning of cages around of balls, points of the application of forces on each of cages can be displaced so, that said forces will pass through the centre of a ball and will have one component. There is an opportunity to have more than three members, thereby increasing functionalities of the converter.

The groove on one cage of torque transmitting unit may be made interrupted and composed of spaced in azimuth slots extended in the line of the wave generator forcing and interchangeable with ledges. This cage serves a carrier-separator and the torque transmitting unit composed from three case in this case will operate by a principle of "two-sinusoidal" gear. Torque transmitting unit composed of four cages with azimuth spaced slots on one of them will realize a principle of "three-sinusoidal" gear in which the cage with said slots serves as non-loaded separator. In torque transmitting unit with more members there are additional parts with different reduction ratio.

In transmitting unit composed of four cages, it is expedient to make azimuth spaced slots on two opposite cages relative to file of balls which cages are mechanically connected with each other. Thus closed grooves on two others opposite cages should be made bent in the line of the axis which through-passes both said cages (with direction between cages). Speed transducer with such torque transmitting unit is intended for transfer of higher moments at the same dimensions.

If grooves on all cages are made closed and between conjugated surfaces of cages there is entered a thin-walled separator with through slots for wave moving rolling bodies it is possible to provide the converter with additional output parts for two and more different speeds. The separator in such design is not loaded member; its function is only to fix angular position of balls during going over coincident peaks and hollows of all periodical grooves. The shape of a separator must to correspond to the shape of interfaced surfaces, i.e. the separator must represent a surface of rotation with one or several ribs. The separator of such shape with other things being equal will have higher durability than a separator of the prototype thereby allowing to decrees its thickness and to displace origins of forces to the centre of a ball that improves the distribution of load. Furthermore in the above described construction there is necessarily to form said separator with a bulge in the field of intersection of the surfaces. The size and shape of this bulge correspond to space between grooves. This bulge even more will raise durability of the separator with other things being equal.

In embodiments with axial wave movement of rolling bodies the periodic groove of the wave generator may be made in the form of ring groove inclined to an axis of rotation (or groove with varying depth). The tilting angle is limited so that distance along an axis between the opposite sides of a ring groove (swing of groove) should be less than radius of a rolling body thereby resulting in that all rolling bodies are being in simultaneous and constant contact with all grooves. Axial overall dimensions of torque transmitting unit practically are not increased in comparison with the prototype realizing radial moving of balls. The generator forces rolling bodies in an axial direction. It creates the balanced system of balls relative to axis. The endless grooves in this construction are made so as their generatrixes lay on an imagined spherical surface with the center of sphere being on an axis of torque transmitting unit. The inclined ring groove will have in this case varying depth and width depending on turning angle, but section of said groove is a circle. The rolling bodies in said torque transmitting unit move uniformly without variable acceleration, thereby causing whole converter to transfer higher torque and to be more reliable to work at high speeds.

In an alternative arrangement, endless periodic groove of the wave generator is made not only inclined, but also eccentric relative to axis of torque transmitting unit. In this case torque transmitting unit is the unit with radial—axial wave movement of rolling bodies. Such embodiment preferably is composed of four cages in which endless grooves are located on cages being on a diagonal relative to ball, and two other cages are located also on a diagonal and have azimuth spaced slots. The maximal working load gets to a bottom of grooves, and there is possible to a realize a point-to-point contact of rolling bodies with the endless grooves to raise output capability of torque transmitting unit with other things being equal.

In one embodiment of the invention the cage of wave generator is male or female relative to other cages, and it forces rolling bodies along an axis of torque transmitting unit (in an axial direction). In this design all endless periodic grooves are made with generatrix lying on an imagined spherical surface with the center on an axis of transmitting unit.

If conjugated coaxial surfaces of cages are made in form of the spherical zone and a cage of the wave generator is mounted in such a way that it is precessional relative to the center of sphere, we shall provide the converter with reduced slippage of balls. The wave generator in this case causes cage to precess. With groove on a side surface of cage of the wave generator in the form of endless direct groove, we shall provide torque transmitting unit with axial wave movement of balls, caused by precession of the wave generator. In order to extend the range of gearing ratio, periodic groove on the side surface of the wave generator is embodied in the form of endless groove zigzagging in axial direction.

There are described various embodiments of wave generator providing precession of the cage. In this invention the wave generator is developed which suited perfectly to the conception of transducer in the form of bearing. The generator involves a shaft embodied in the form of a cage coaxial to torque transmitting unit and arranged in opposition to grooved surfaces of the precession cage. At conjugated surfaces of a shaft of the generator and precessing cage a ring groove and ring lug are made. Said ring groove and ring lug are conjugated in such way that between groove and lug on each side of lug are two diametrically opposite balls.

In order to increase the output capability and endurance the torque transmitting unit with axial moving balls and the wave generator coaxial to other cages, the wave generator is modified. For this purpose, on the side surface of a cage of the wave generator faced to other cages there is made closed slot inclined to an axis in which the ring insert with sockets for balls on the side surface is freely embedded. All interfaced surfaces of members of this transmitting unit are part-spherical. For convenience of assembly the ring insert is formed by separate segments.

BRIEF DESCRIPTION OF DRAWINGS

In the following description, reference will be made to the accompanying drawings. It should be noted that the invention is not limited to the embodiments described above.

FIGS. 9 and 11 illustrate circuits of transmitting unit with a thin-walled separator entered between conjugated surfaces of cages.

BEST MODE FOR CARRYING OUT THE INVENTION

Figure 1:
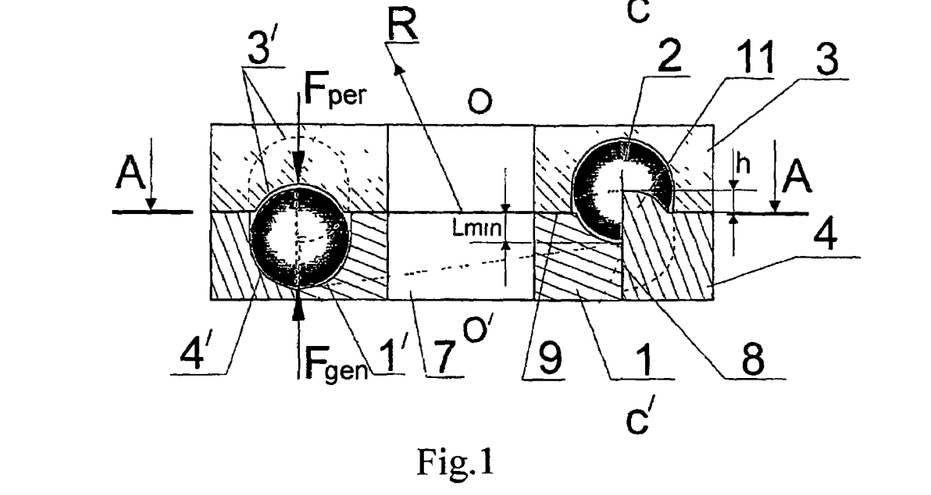
FIGS. 1, 3, 4, 5, 6, 9, 11 and 12 are schematic representations of various configurations of the torque transmitting unit.
Figure 3:
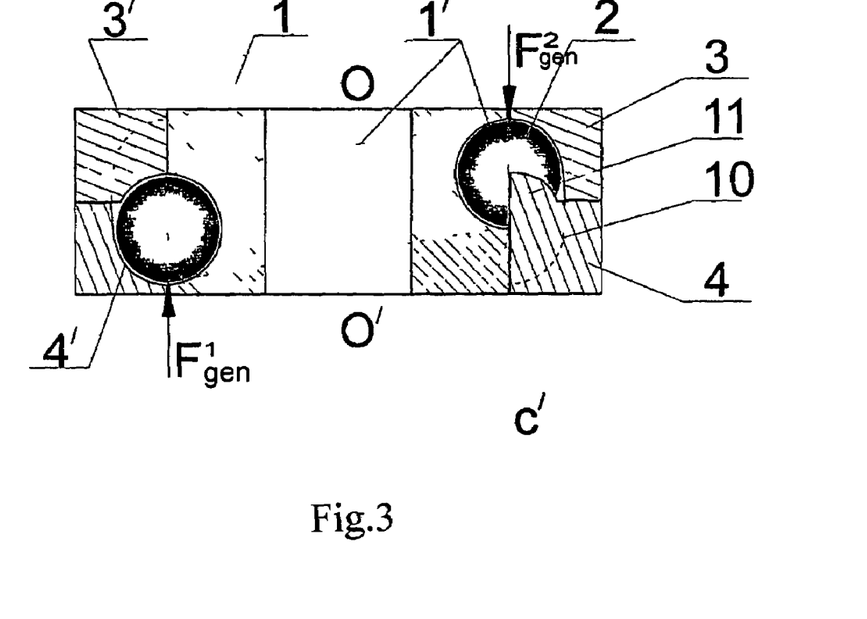
Figure 4:
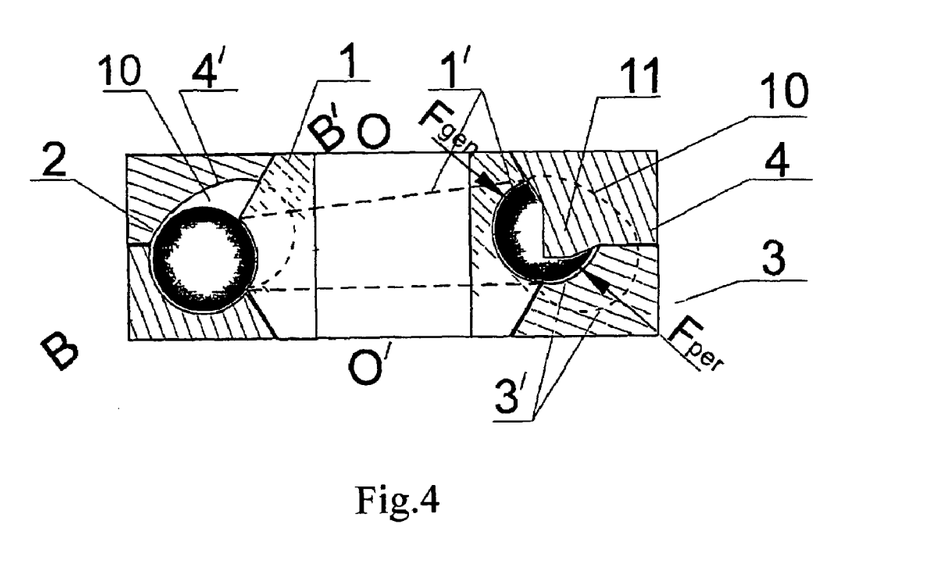
Figure 5:
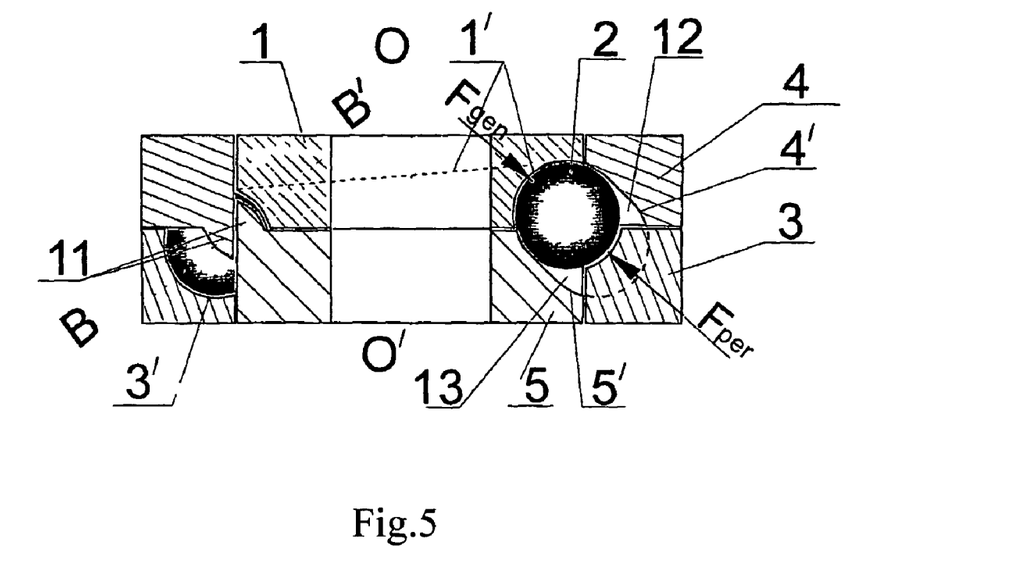
Figure 6:
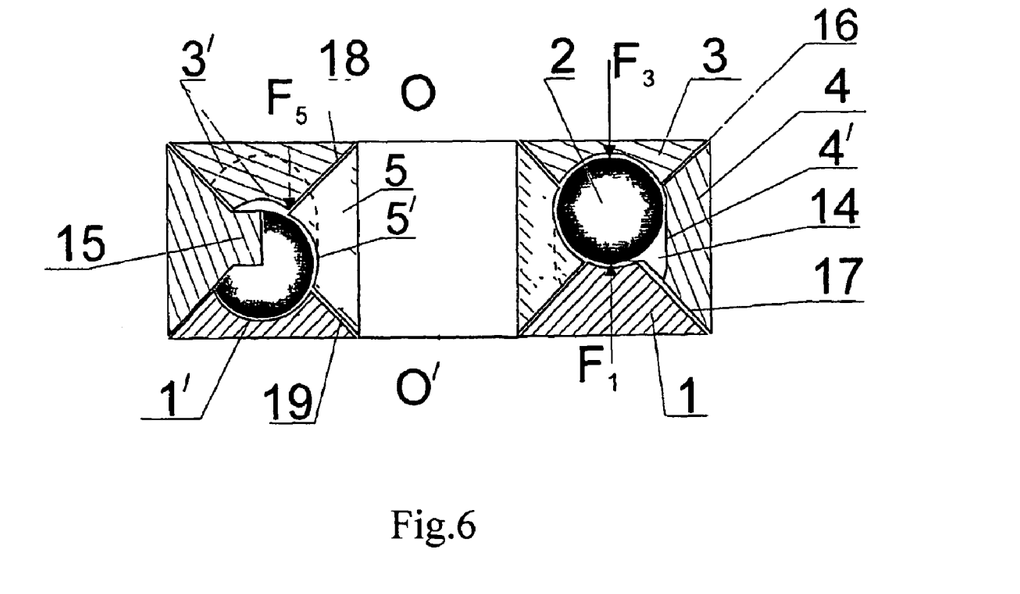
Figure 12:
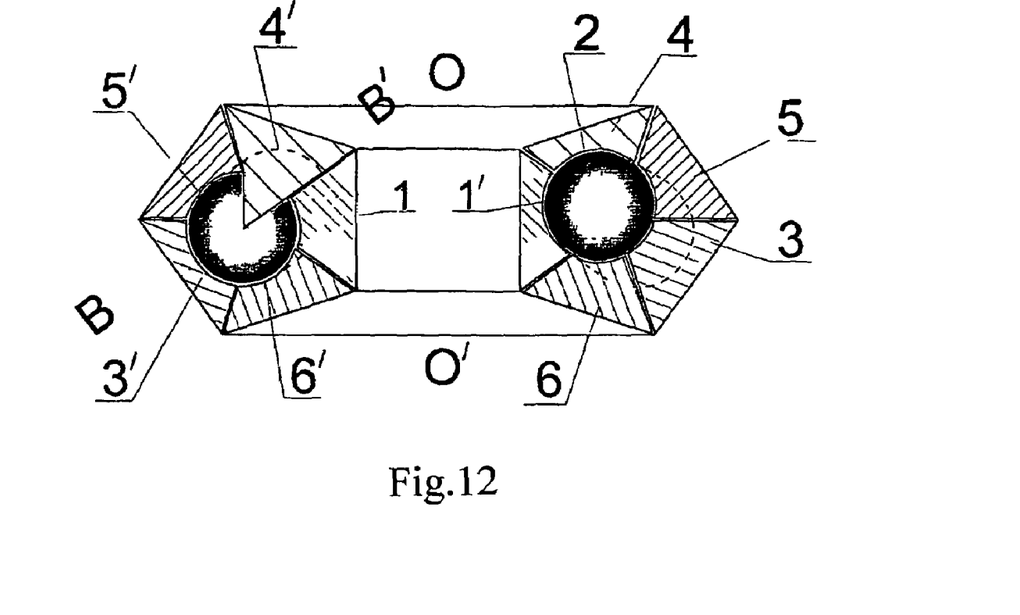

Transmitting units at FIGS. 1, 3 and 4 are composed of three cages, at FIGS. 5 and 6—of four cages with a different relative positioning of interfaced surfaces, and at FIG. 12 transmitting unit is composed of five cages. At all figures by 1 is designated the cage of the wave generator, by 2 designated rolling bodies—balls, by 3, 4, 5 and 6—other cages of transmitting unit. Said cages are arranged relative each other in such a way that each of cages conjugates to two adjacent (a cage 1 at FIGS. 1, 3, 4 is conjugated to cages 3 and 4, and at FIGS. 5 and 6 a cage 1 is conjugated to cages 4 and 5). Thereto at least two cages conjugate by their intersecting surfaces (cages 1 and 4 at FIG. 1, cages 3 and 4 at FIG. 3; and all cages at other figures). Thus, all cages are interfaced with each other around of one circle. By this circle on each of cages 1, 3, 4, 5 and 6 there are embodied periodic grooves for the balls 2, designated accordingly 1', 3', 4', 5', 6'. Said grooves are disposed in interface of intersecting surfaces of cages and have different directions of a bend in different embodiments of invention. The direction of a bend of all grooves in any given embodiment is the specific and same and corresponding to a direction of forcing balls by a cage of the wave generator.

At FIGS. 1, 3 and 6 there are shown torque transmitting units with a bend of grooves and with movement of balls along of axial direction (along of axis OO'). Periodically bent generatrix of grooves 1' and 3' at cages 1 and 3 are the endless zigzagging in an axial direction line which lies on an imagined spherical surface of radius R at the equatorial area of said sphere. In the generator with wave number of 1, the groove 1' represents the ring slot inclined to axis OO', generatrix of which groove is a circle. In other words the file of balls 2 represents a circle precessing relative to the center of sphere, and balls make only angular movement during operation. Otherwise, the motion path of balls is deformed to an ellipse resulting in their periodic radial acceleration, causing the beating and limiting the transmitted moment. In the case that the amplitude of wave moving of a ball is much less than radius R approximately it is possible to replace an imagined spherical surface by cylindrical surface with generatrix CC'. In our invention this condition is met at r<<R because of the amplitude of wave moving of a ball can not exceed its radius r otherwise the ball will come out of contact with one or several cages.

Transmitting units at FIGS. 4, 5, 9, 11 and 12 have a radial-axial direction of a bend of grooves, i.e. the periodic generatrix of grooves 1', 3', 5', and 6' is endless zigzagging line bent in an axial direction on an imagined conic surface with cone generatrix BB'.

Thus, in axial cross section of the converter all cages having grooves are located around of balls 2, and conjugated with each other, and said grooves form cavities for balls with the closed contour in axial section. The form of cross section of cages may be various and is determinate by two basic requirements. The first requirement concerns to that all cages should have constant contact to balls 2, therefore the angle between conjugated interfaced surfaces of each cage is determined by number of cages. The second requirement is connected to adaptability of manufacturing of cages.

Figure 2:
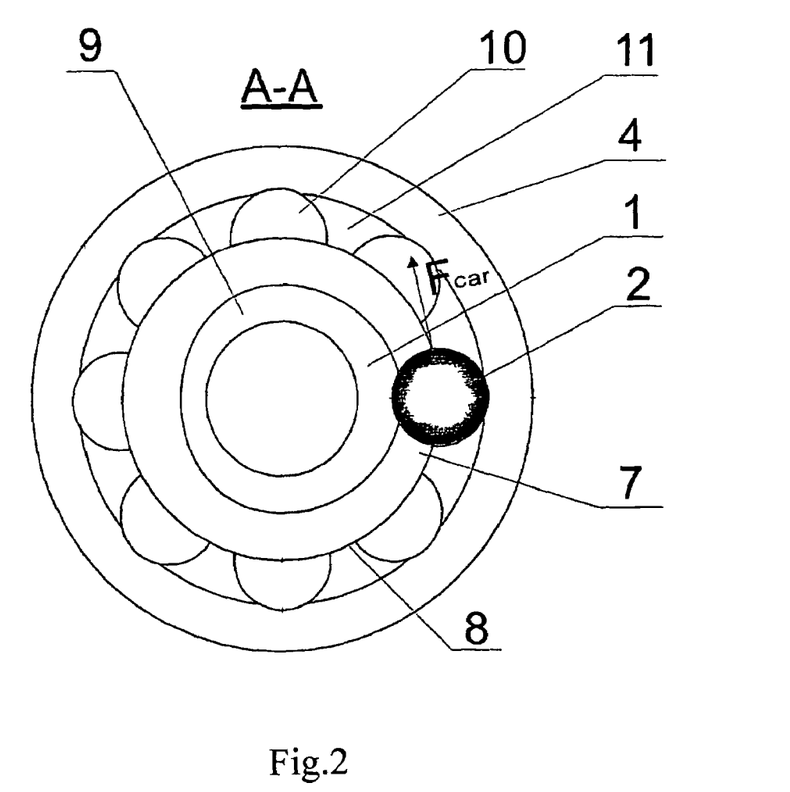
FIG. 2 is a section along the line A—A of transmitting unit shown at FIG. 1.

The transmitting unit, at FIGS. 1 and 2, realizes two-sinusoidal gear. The periodic groove 1' of cage 1 of wave generator represents the endless inclined groove 7, (or groove with varying depth), located in a place of interfacing lateral 8 and face 9 surfaces of the cage 1, the generatrix of which lays on a surface of sphere of radius R (or on a cylindrical surface with cylinder generatrix CC'). The number of the periods of a groove in this cage is equal 1. The groove 4' at a cage 4 represents system of the azimuthally spaced slots 10 and alternating with ledges 11, located also in interfacing of surfaces of a cage 4. Said slots have the depth appropriate to the maximal depth of a groove 7, and the semicircular slot shape appropriate to the shape of a ball 2. The height h of the ledges 11 above a face surface of a cage 4 is determined by the minimal depth $1_{min}$ of a groove 7, and is h=r–$1_{min}$, where r is radius of a ball 2. The number of slots 10 is equal to number of balls 2. The cage 4 with slots 10 serves as planet carrier and separator i.e. fixes a mutual angular arrangement of balls and takes in the torque from a file of balls as of a single whole. Ledges 11 are intended for keeping balls 2 in extreme axial position, i.e. in a place of the minimal depth of a groove 7 (at FIG. 1 it is a position on the right). The periodic groove 3' at a cage 3 represents also the endless periodic groove at a face surface of a cage 3, with number of the periods nk±1 (where n—an integer, and k—number of balls).

Periodic generatrix of groove 3', being in this case an average line of a groove also lays on a spherical surface of radius R and the groove 3' is wavy bent in an axial direction. In some embodiments the spherical surface may be approximately replaced by a cylindrical surface with generatrix CC'. The periodic groove 3' can be embodied by periodic displacement of a ring slot in an axial direction. The size of this displacement (or amplitude of a periodic groove) would not be exceeding radius of a ball so as the ball to be in simultaneous contact to all three grooves. I.e. the distance between a groove 1' at a cage of the wave generator 1 in its maximal depth and a groove 3' at its top is equal to diameter of a ball 2. On FIGS. 1, 2 the forces acting to a ball 2 from the part of cages are shown. Force $F_{gen}$ from the side of a cage 1 of wave generator and reaction force $F_{per}$ from a periodic groove of a cage 3 are directed along an axis which axis passes through the center of a ball 2 and coincides with direction of ball wave movement, therefore each of said forces have only one component which carries out useful work. By $F_{car}$ is designated the force from the side of a ball against a cage 4, which cage serves as planet carrier-separator in the given design. This force to edge of a slot 10 directed at a tangent to a cage 4, causes appearance of a torque. If the cage 1 of wave generator is connected to drive shaft and separator 4 is grounded, the cage 3 is the driven member. If the cage 3 is grounded to housing, the cage of separator 4 with slots 10 is driven member. It is necessary to note, that the groove 1' at a cage 1 of the wave generator may be embodied in form of multiperiodic groove. Then positions and balance of forces will not change, and the gear ratio will change only.

The torque transmitting unit represented at FIG. 3 is different from previous once only that the periodic groove 1' embodied as inclined ring groove on an external lateral surface of a cage 1 of a wave generator, and the endless periodic groove 3' embodied in location of intersecting of internal lateral and face surfaces of a cage 3. Due to such embodiment of a cage 1 of the wave generator, a force acts to a ball in both half-cycles of the wave generator (force $F_{gen1}$ acts during the first half-cycle and $F_{gen2}$ acts during second half-cycle).

The torque transmitting unit at FIG. 4 has three cages 1, 3, 4 conjugated by their intersecting surfaces, and the periodic grooves are arranged in a locus of intersecting of two surfaces of each cage. The periodic groove 1' at a cage 1 represents inclined and eccentric groove arranged in a locus of intersecting of surfaces of a cage 1. The generatrix of periodically bent groove 3' lays on a surface of an imagined cone with generatrix BB', and this groove has crests and valleys located in a radial-axial direction, i.e. the ball 2 reciprocates along of BB'. The periodic groove at a cage 4 serving as a planet carrier-separator represents system of slots 10 spaced along circle and elongated in direction BB', alternating with ledges 11. The mutual positioning of cages 1 and 3 provides application the forces $F_{gen}$ and $F_{per}$ not to edges of grooves, thereby providing opportunity of realization of point-to-point contact of rolling bodies 2 with said grooves.

Torque transmitting units composed of 4 cages are shown on FIGS. 5 and 6. This torque transmitting unit may be based on both two-sinusoidal and three-sinusoidal principles.

For example torque transmitting unit at FIG. 5 is based on two-sinusoidal principle, and torque transmitting unit at FIG. 6 is based on three-sinusoidal principle. In the arrangement at FIG. 5 the periodic groove 1' at a cage 1 of the wave generator is located in locus of intersecting of face and lateral surfaces of this cage in the form of a ring slot eccentric displaced and inclined relative to axis OO' of the unit. The periodic generatrix of the endless periodic groove 3' lays on imaged conical surface with the generatrix BB', both crests and valleys of said groove 3' are directed along of BB'. Periodic grooves at cages 4 and 5 are made interrupted in the form of spaced in a circle slots 12 and 13, elongated in direction BB', alternating with ledges 11. Cages 4 and 5 are mechanically connected with each other and together serve as a carrier-separator of two-sinusoidal torque transmitting unit to transfer of higher torque. The forces $F_{gen}$ and $F_{per}$ to grooves 1' and 3' pass through middle of these grooves thereby allowing realizing point-to-point contact of balls 2 with said grooves. A force through a carrier-separator (cages 4 and 5) $F_{car}$ also may be increased, since it is shared by two forces acting to cages 4 and 5, since balls 2 cooperate with two systems of slots 12 and 13. All aforesaid is fairly for the torque transmitting unit represented at FIG. 6 if cages 4 and 5 are identical and constitute a carrier-separator.

Figure 7:
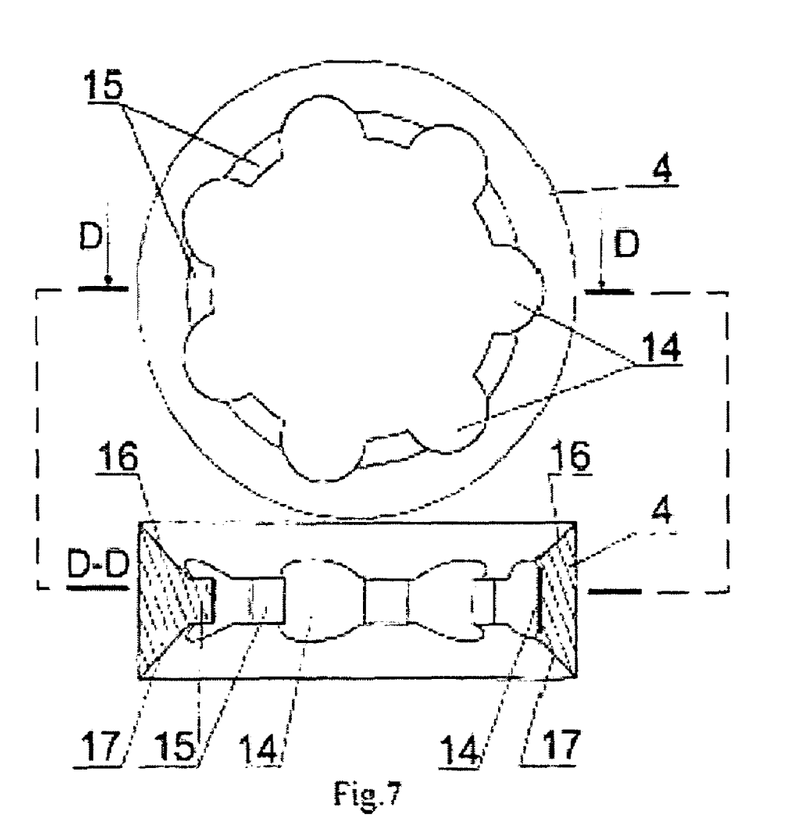
FIG. 7 illustrates the cage which serves as planet carrier in configuration shown on FIG. 6 and its section along the line B—B.

All cages of transmitting unit at FIG. 6 have triangular cross section. This unit is developed for axial moving rolling bodies since in it balancing of balls is improved and the appropriate grooves are simpler in manufacturing. For example, the groove of a cage 1 of wave generator represents the ring slot of variable depth arranged in a locus of intersection of conjugated surfaces of a cage 1. The periodic groove 3' represents endless ring groove periodically bent in an axial direction. FIG. 7 shows the general view of a cage 4 and a sectional view of interrupted groove 4' taken along line D—D. Interrupted groove 4' represents set of slots 14 elongated in an axial direction and spaced in a circle of intersecting of surfaces 16 and 17 constituting the cage 4. Slots 14 alternate with the ledges 15 intended for holding balls 2 in their extreme axial positions.

Figure 8:
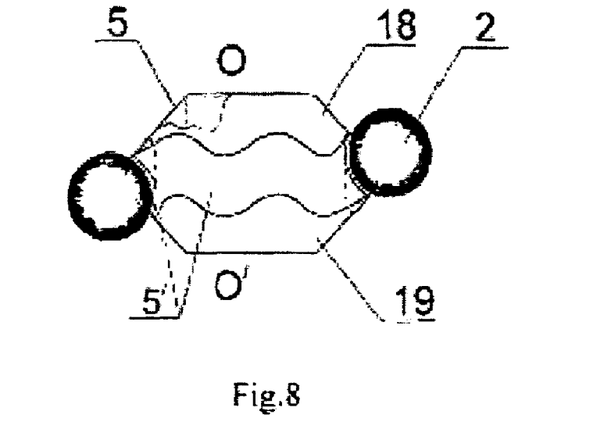
FIG. 8 illustrates the cage being an additional output in the configuration of FIG. 6.

If in arrangements shown at FIGS. 5 and 6, slots 14 are arranged only at the cage 4, and an endless periodic groove 5' similar to a groove 3' but having differing number of the periods in it, is arranged at a cage 5, there is the torque transmitting unit with two outputs capable to different gear ratio. Numbers of the periods of grooves must be subject to a follow condition:

$$z_3 = nk \pm z_1, \; z_5 = mk \pm z_1 \qquad (1);$$

where n and m—integers; k—the number of balls equal to number of slots 14 in cage 4; $z_1$, $z_3$, $z_5$—are accordingly the numbers of the periods in a cage 1 of the wave generator, cage 3 and cage 5, (see Ignatishchev R. M. "Three-sinusoidal ball transfer the Bulletin of mechanical engineering", 1987, No. 2). The groove 5' is arranged in a locus of intersection of surfaces 18 and 19 constituting a cage 5 (see FIG. 8) and is endless and bent in an axial direction groove.

If the torque transmitting unit with radial wave moving balls is desired, the cages 1 and 3 of embodiment of FIG. 6 are changed places with cages 4 and 5. However, it will be noted that this transmitting unit is expedient for applying only in speed transducers for low torque since with increase of torque the sizes of rolling bodies are increased, thereby increasing a disbalance of the torque transmitting unit.

Figure 9:
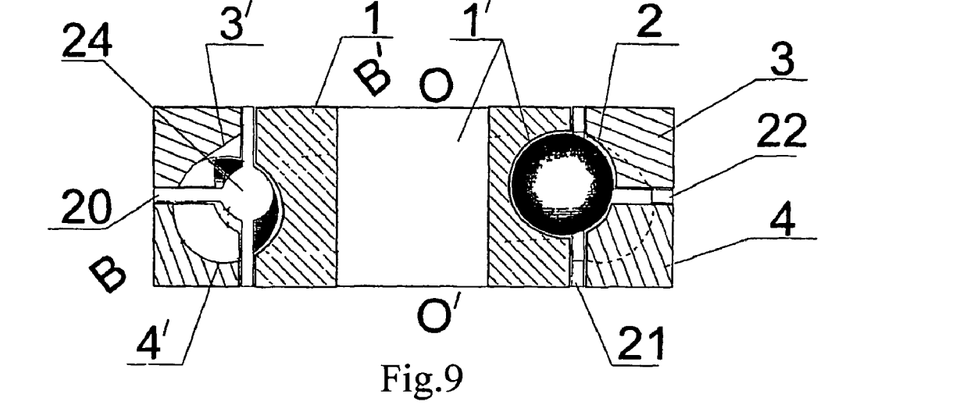
Figure 10:
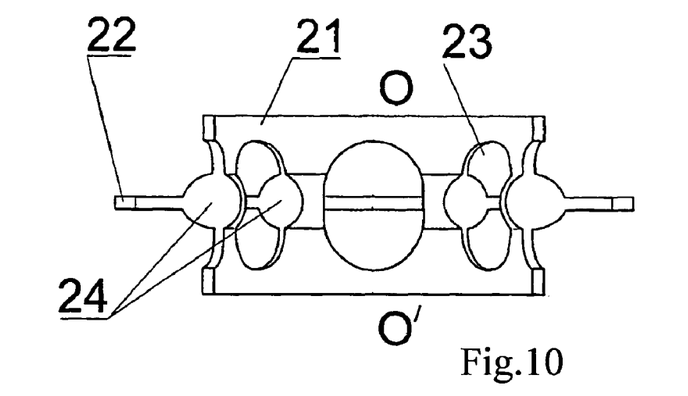
FIG. 10 shows a thin-walled separator for transmitting unit composed of three cages.
Figure 11:
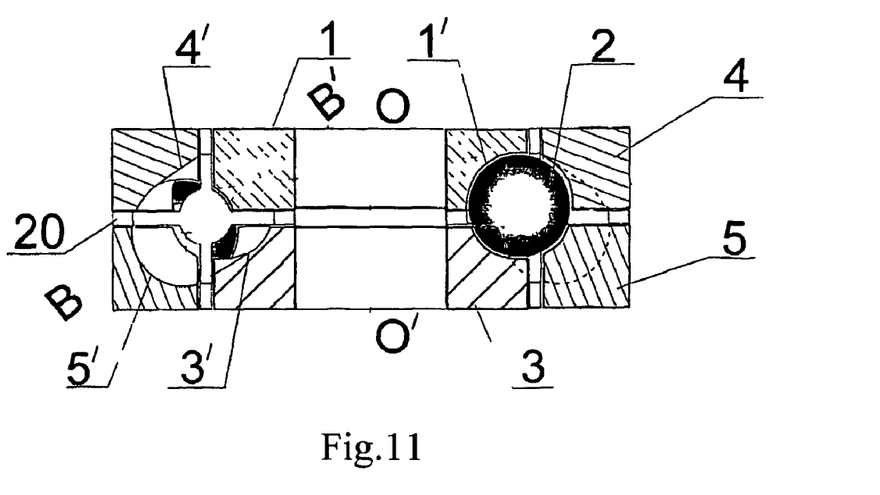

The transducer with transmitting unit composed of three cages also may realize three-sinusoidal gear (see FIG. 9). For these purpose periodic grooves at all three cages are made endless, and between conjugated surfaces of cages the thin-walled separator 20 is incorporated (see FIG. 10). A thin-walled separator 20, intended for mutual angular fixation of balls 2 while balls are running upon crests and valleys of simultaneously all three periodic grooves. The shape of a separator 20 conforms to the shape of the conjugated surfaces. In this case the separator consists of two intersected surfaces: cylindrical surface 21 and a flat ring 22. In a locus of intersecting of surfaces 21 and 22 in a circle are arranged slots 23 for balls 2. These slots should not limit wave moving of balls. It is desirable to provide the thickening 24 arranged in intersection of surfaces 21 and 22, the sizes and shape of which are defined by conjugated grooves 1', 3', and 4', said sizes and shape are differing for transmitting units with a different direction of wave moving balls. The thickening 24 occupies free space between grooves and does not displace points of the appliance of forces and also do not change their balance. Since intersected surfaces 21 and 22 of separator 20 form stiffening ribs and the design is strengthened by the thickening 24, the walls 21 and 22 of a separator may be manufactured more thin than these are in the prototype. Due to it, the forces to balls 2 from the side of grooves are very little displaced from a direction passing through the center of a ball, and their decomposition on two components practically does not occur. If a separator 20 is entered into transmitting unit composed of four cages (FIG. 11), and all grooves are embodied endless ones, the three-sinusoidal gear there will have an additional output member—a cage 5.

The same properties inhere in torque transmitting unit composed of five cages located around of a file of balls 2 (FIG. 12). Here the cage 4 have interrupted periodic groove 4', composed of series of spaced slots and ledges, (as well as on FIG. 5). Periodic grooves on other cages are endless. One of cages is the wave generator, and the others are the output members of the transmitting unit.

To explain how described devices function let's consider torque transmitting unit composed of three cages (FIGS. 1, 3, 4). An input member for this unit is the cage 1 of a wave generator. One of cages of transmitting unit should be fixedly attached to the housing. It may be a cage 3 with the endless groove, or a cage 4 with an interrupted groove. The choice of a fixed cage is made for each concrete mechanism, to promote the convenience of setting-up of the transmitting unit. For simplicity we consider the singly-periodic wave generator with inclined or eccentric ring slot in a cage 1. Every full revolution of a cage 1 of wave generator will cause each ball 2 to successive move by one wave of reciprocating moving. The direction of this moving relative to axis of transmitting unit OO' may be various: parallel to the axis (axial gear), perpendicular to the axis (radial gear) or inclined by some angle to the axis (radial-axial gear). Moving of each ball 2 corresponds to oscillatory motion of the whole file of balls relative to axis OO'. Said oscillatory motion is precession in axial gear, plane-parallel orbital motion in radial gear, and complex motion including precession and plane-parallel orbital motion in radial-axial gear. Balls 2 interacting with a periodic groove 3' in a cage 3 like cams and with slots 10 in a cage 4 cause one of said cages 3 or 4 to rotate relative to other by angle equal to the period of a groove 3'. The proposed torque transmission unit may operate also in differential mode, for this purpose one of said cages 3 or 4 is connected with another drive instead of housing. Then the output speed of rotation of the transmitting unit depends on input speeds ratio and gear ratio. Transmitting unit at FIG. 5 operates similarly to that described above though it is composed of four cages, but, as a matter of fact, is three-member since a cages 4 and 5 operate as single member, namely, carrier-separator.

Operation of the transmitting unit composed of four and more cages we shall consider on an example of FIG. 6. Here, cages 1, 3, and 4 interact like that described above. A cage 5 with a groove 5' in which number of the periods satisfies to a equation (1), and it is not equal to number of the periods of a path 3' is the second output of transmitting unit. Reciprocating balls 2 force to not only a cage 3, but also a cage 5, causing its rotation relative to a fixed cage by angle equal to the period of a groove 5'. Thus, there is an opportunity to output from one transmitting unit two and more speeds of rotation. It is necessary to note, that the torque which may be transfered a cage 5, is less than torque through a cage 3 since the groove 5' operates in conditions of distribution of the forces approached to the prototype. (Forces $F_1$ and $F_3$ lay on one straight line through the center of a ball, and force $F_5$ is displaced from this straight line).

Figure 13:
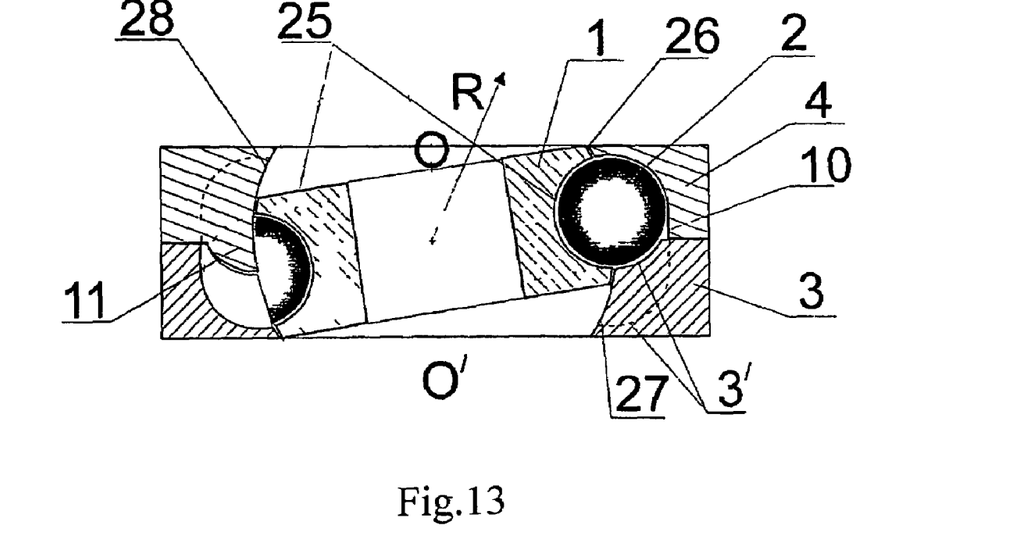
FIG. 13 schematically illustrates transmitting unit with precessional cage and with axial moving rolling bodies.
Figure 14:
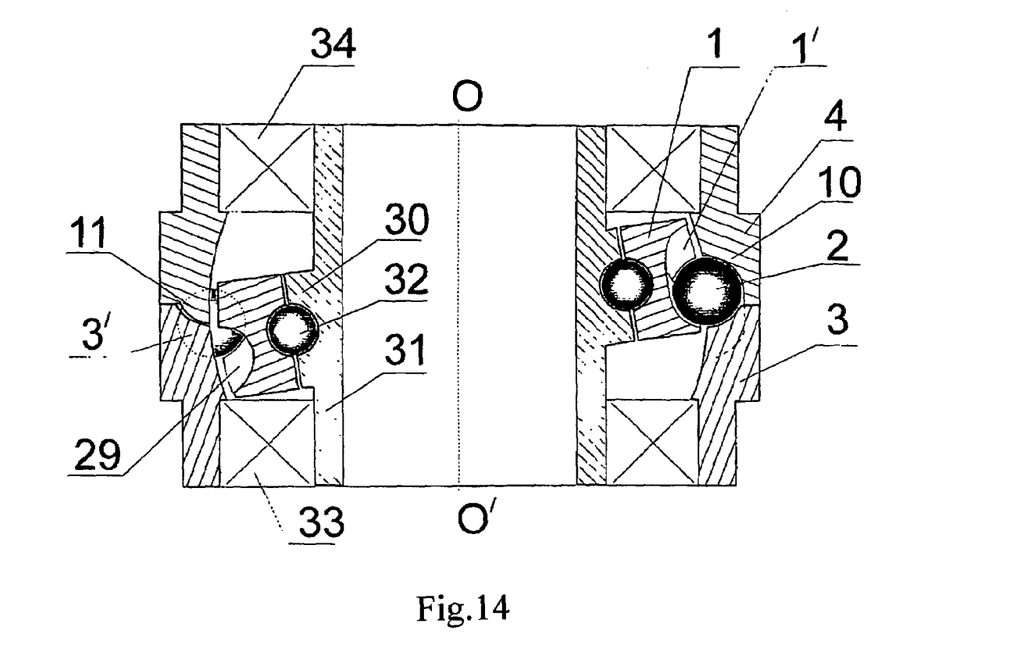
FIGS. 14 and 15 show variants of a design of the transducer with transmitting units which differ from each other only by design of the wave generator.

In the above described designs with axial motion of the ball, caused by its running in inclined ring slot 1' in cage 1 of the wave generator 1, balls 2 participate in the complex motion including running upon inclined ring slot 1', and running upon a periodic groove 3', rotation around of an own axis and reciprocal motion in slots of a cage 4. Such movement is accompanied by balls slippage and by increased wear of grooves and balls, especially at the high torques or high speeds. For reduction of slippage there is developed the torque transmitting unit with a precession cage (FIG. 13). In that unit the cage 1 of the wave generator is coaxial to cages 3 and 4. Precession is provided by the wave generator, the concrete and original designs of which are described below. The endless groove of a cage 1 is made in the form of a direct ring slot 25. Coaxial conjugated surfaces 26, 27 and 28 of cages 1, 3, and 4 have the form of a spherical zone of radius R equal to the radius of the conjugated coaxial surfaces. The grooves in cages 3, and 4 in two-sinusoidal gear are the same that in the scheme of FIG. 1. In the three-sinusoidal gear the grooves in all cages are made endless, and between conjugated surfaces of cages there is located a thin-walled separator (at FIG. 13 it is not shown). For expansion of a range of gear ratio, the wave generator may be made multiwave (FIG. 14). This may be achieved if the groove 1' is made as endless periodic bent groove 29.

The cage 1 is supported by bearing 32 at a crank 30 of crankshaft 31 of the wave generator. The cage 3 at surface thereof is provided with the endless periodic groove 3' bent along an axis of the transmitting unit. The cage 4 is a carrier-separator and have at surface thereof the slots 10 alternating with ledges 11. FIG. 14 shows one of variants of assembling of cages 1, 3, and 4 of transmitting unit. All elements are mounted at the shaft 31 of the wave generator. Cages 3 and 4 are mounted at a shaft 31 through bearings 33 and 34 which cover end faces of transmitting unit.

Figure 15:
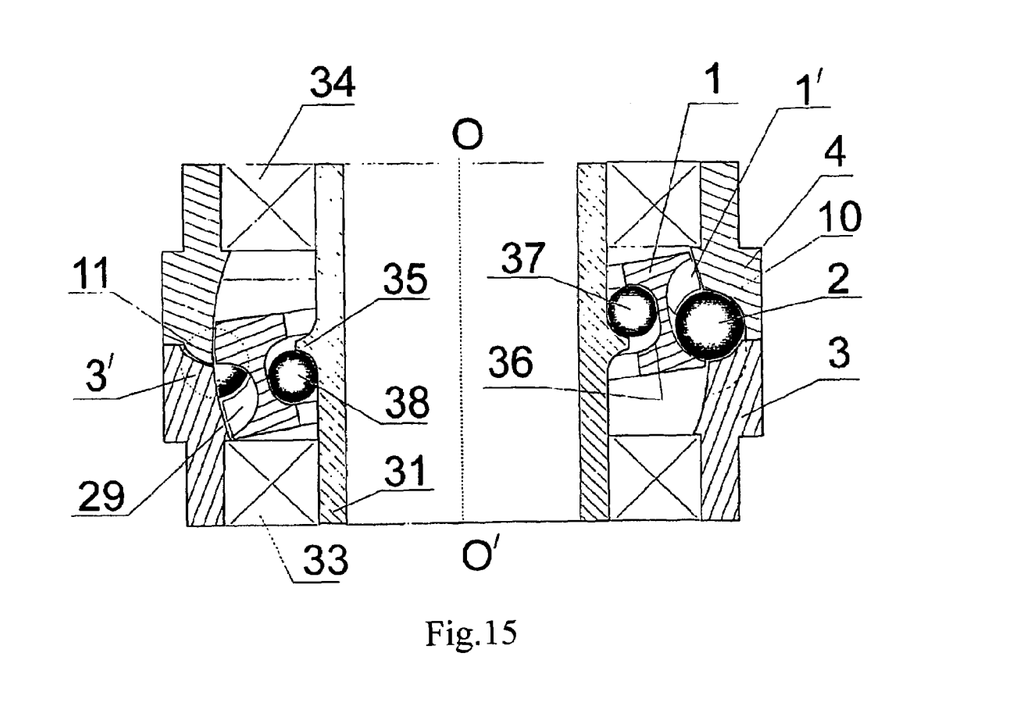

The wave generator at FIG. 15 represents a shaft 31 provided coaxially with cages of transmitting unit at the opposite side of a periodic groove 1'. In this design the shaft 31 is located inside of precession cage 1. At conjugated lateral surfaces of a shaft 31 and cage 1 are provided a ledge 35 and a slot 36. Between a ledge 35 and a slot 36 at the opposite sides of a ledge there are two balls 37 and 38 at diametrically opposite positions.

This transmitting unit which is capable of reducing a slippage operates as follows. As well as in the above described variants one of cages is fixed. Consider variant when the cage 4 is fixed. Rotation of driving shaft 31 will cause orbiting of balls 37 and 38 between a ledge 35 and a ring slot 36. With orbiting of balls the tilt of a cage 1 will move on an azimuth. One complete orbiting of balls corresponds to one wave of precession of a cage 1. Rotation of a shaft 31 is not be transferred to a cage 1 since it is loose of driving shaft by balls 37 and 38 (at FIG. 15) or by bearing 32 (at FIG. 14). The groove 1' of a cage 1 pushes down the balls 2, causing their axial motion relative to slots 10. Since balls 2 are in slots 10 of fixed cage 4 they will cause rotation of a groove 29 and, accordingly, of a cage 1 by angle corresponding to the period of groove 29. At the same time, the ball 2, interacting with a groove 3' in a cage 3, cause its rotation relative to a cage 1 by angle equal to the period of a groove 3'. The total movement of a cage 3 relative to a fixed cage 4 is equal to the sum or to a difference of above movements, and the gear ratio is defined by a ratio of the periods of grooves 29 and 3'. Thus, each ball 2 runs in grooves 29 and 3' without slippage, and rotation is transferred by pressure of a ball as a cam to profile cam surfaces of cages 3 and 1. Balls 2 are subjected to a sliding friction only during axial motion in slots 10. Aforesaid is right for a reducer in which an input member is the shaft 31 of the wave generator. For the multiplicator the input and output members are reverse.

Figure 16:
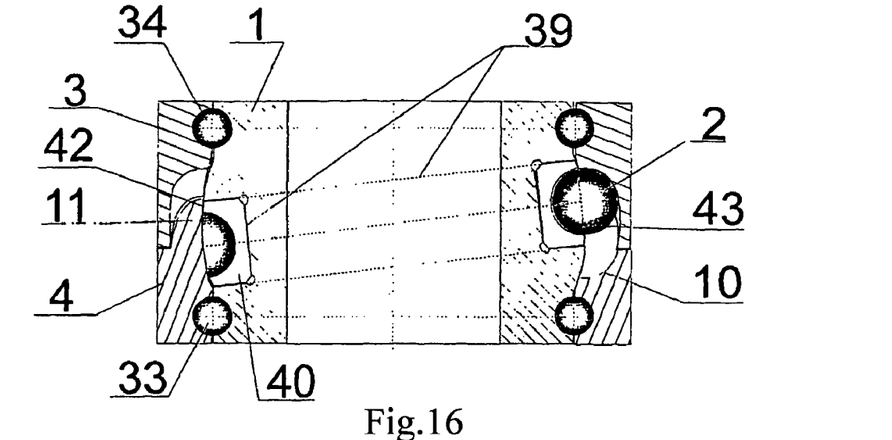
FIGS. 16 and 17 show the variants of a design of converters with a ring insertion.
Figure 17:
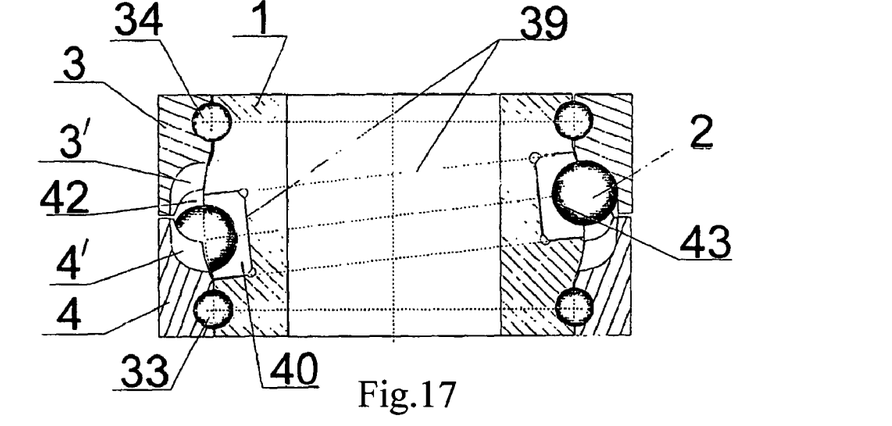
Figure 18:
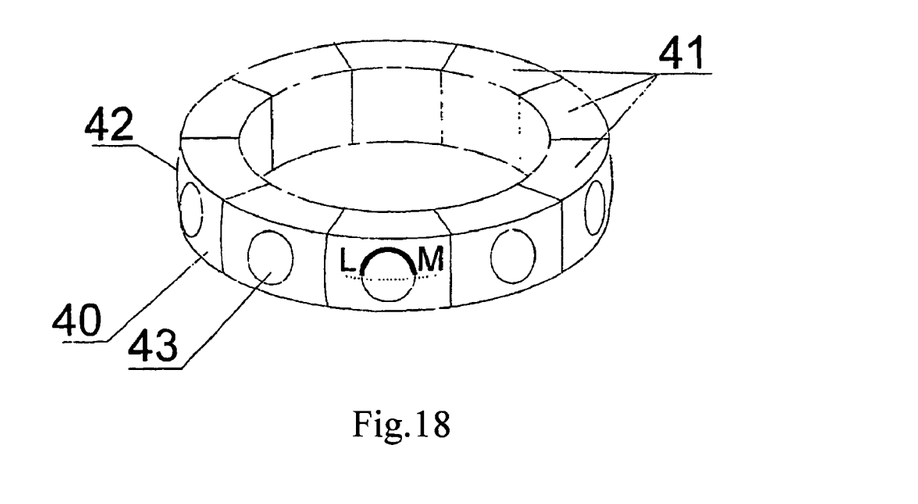
FIG. 18 is the general view of a ring insertion.

Devices shown at FIGS. 16 and 17 differ from each other only by the design of periodic groove of a cage 4. In device of FIG. 16 the groove 4' is interrupted and composed of spaced in an azimuth slots 10, alternating with ledges 11, and in device at FIG. 17 a groove 4' is endless. The cage 1 of wave generator in this design is located inside of a cage 3 and 4 and is conjugated to them by the side surface formed as a spherical zone. In a side surface of the cage 1 faced to cages 3 and 4 there is ring groove 39 of rectangular section inclined to an axis. In this groove the ring insert 40 consisting of separate segments 41 is freely located. Segment embodiment of an insert is caused by requirements of assembly. The insert may be whole. Then it is necessary to make a shaft—cage 1 as prefabricated element. An external side surface of insert 42, as well as conjugated with it surfaces of cages 3 and 4 is spherically bent with the center at an axis of transmitting unit. At this surface are provided slots 43 for balls 2. In the device shown at FIG. 17 insert 40 with slots 43 also serves as a thin-walled separator, fixing balls 2 on identical angular distance from each other in the endless periodically bent grooves 3' and 4'. As well as at FIGS. 14 and 15 cages 3 and 4 by means of bearings 33 and 34 are mounted at a cage 1. During rotation of a cage 1 of wave generator the insert 40 pushes a ball 2, causing its axial wave motion. Thus pressure upon a ball occurs from surface of slot 43 designated LM at FIG. 18. Pressure upon an insert 40 from a cage 1 is distributed also among end walls of the insert. Due to this transmitting unit is capable to transfer high loadings without destruction of balls. To reduce friction of an insert 40 against a wall of a groove 39, it is expedient to manufacture the insert 40 of an antifriction material. In other respect the operation of the transmitting unit does not differ from that of the above described designs.

Thus, there are presented the various embodiments of the torque transmitting unit constructed by one principle and having certain advantages over prior art.

Clearly, that each of designs described above may be used separately or together and have multiplicity of application in mechanisms which differ from above described. In particular, at all figures the cage of the wave generator is located inside other cages. However, in some cases is more preferable the torque transmitting unit with an external arrangement of cage of the wave generator. The choice of particular design is defined by concrete requirements of driving gear in which the transmitting unit is applied.

While the invention has been described with reference to the specific embodiments, it is understood that this description is not to be construed in limiting sense in as much as various modifications and additions to the specific embodiments may be made by skilled artisans without departing from the spirit and scope of the invention.

The invention claimed is:

1. A gear-bearing differential speed transducer on basis of wave gear with intermediate rolling bodies comprising a wave generator and torque transmitting unit, said transmitting unit including at least three cooperating cage members, each of said cage members having a profile cam surface in the form of periodic along azimuth grooves continuously interacting with said rolling bodies, one of said cage members coupled to said wave generator, and at least in one of said other cage members said groove is a periodically bent endless one and any endless periodic grooves of the resi of the other cages members are bent in the same direction, characterized in that the cage members are embodied in the form of coaxial to each other cages, each of said cage members conjugated with two adjacent cages, and at least two of said cage members conjugated by their intersecting surfaces, said grooves are located at said intersecting surfaces, said cage member coupled to said wave generator arranged so as to force said rolling bodies in a direction in a plane of axial section of said transmitting unit.

2. Gear-bearing differential speed transducer according to claim 1, characterized in that said periodic groove at least in one of said cage members is formed interrupted and is composed of a plurality of azimuthally spaced apart slots extending in the direction of said wave generator force and alternating with ledges.

3. Gear-bearing differential speed transducer according to claim 2, characterized in that the torque transmitting unit is composed of four cage members, wherein:

two of the cage members have azimuthally spaced apart slots and are opposite each other relative to a file of the rolling bodies which cage members are mechanically-coupled; and the endless grooves in the two rest of the cage members are bent in the direction between them.

4. Gear-bearing differential speed transducer according to claim 1 characterized in that between said conjugated surfaces of cages a thin-walled separator is introduced with the shape thereof mated to that of said conjugated surfaces, said separator provided with through slots for receipt of said rolling bodies, and said grooves in all cages are endless.

5. Gear-bearing differential speed transducer according to claim 4 characterized in that said separator is provided with a bulge in the area of said intersecting surfaces, sizes and shape of which bulge correspond to space between said grooves.

6. Gear-bearing differential speed transducer according to claim 1 characterized in that the groove in said one cage member coupled to said wave generator is made in the form of a ring groove skewed to an axis of rotation.

7. Gear-bearing differential speed transducer according to claim 6 characterized in that said skewed ring groove is eccentric to an axis of said transmitting unit.

8. Gear-bearing differential speed transducer according to claim 1 characterized in that said one cage member coupled to said wave generator is coaxial to the rest of the cage members and it forces said rolling bodies in the axial direction.

9. Gear-bearing differential speed transducer according to claim 8 characterized in that the generatrixes of all said endless periodic grooves lie on an imaginary spherical surface with the center thereof lying in the axis of said transmitting unit.

10. Gear-bearing differential speed transducer according to claim 8 characterized in that conjugated coaxial surfaces of all cage members are made in the form of a spherical zone, the cage member coupled to said wave generator mounted precessing relative to the center of the sphere, and the wave generator is the device causing precession.

11. Gear-bearing differential speed transducer according to claim 10 characterized in that the periodic groove in the cage member operated by the wave generator is located at a side surface thereof being straight one in the form of an annular ring.

12. Gear-bearing differential speed transducer according to claim 10 characterized in that the periodic groove in the cage member coupled to the wave generator is located at a side surface thereof being an axial zigzagging endless one.

13. Gear-bearing differential speed transducer according to claim 10 characterized in that the wave generator provides precession and contains a shaft in the form of a cage coaxial to said transmitting unit mounted at opposite end of the profiled cam surface of the precession cage, at conjugated surfaces of said shaft and of said precession cage are mated ring slot and ring lug, so that between said lug and slot walls at opposite sides of lug are locating two balls diametrically opposite one another.

14. Gear-bearing differential speed transducer according to claim 1 characterized in that the cage member counted to the wave generator is coaxial to the rest of the cage members, and is provided with an endless annular slot located at a side surface thereof faced to the other cage members, the endless slot is skewed to the axis of the transmitting unit and is provided with a ring insert located inside of the endless slot, the ring insert, having recesses at the side surface to receive the rolling bodies, and the conjugated surfaces of said cage members and of said ring insert are formed as spherical zones.

15. Gear-bearing differential speed transducer according to claim 14 characterized in that said ring insert includes several segments.

16. A gear-bearing differential speed transducer on basis of wave gear with intermediate rolling bodies comprising a wave generator and torque transmitting unit, said transmitting unit including several cooperating members, each of said members having a profile cam surface in the form of periodic along azimuth grooves continuously interacting with said rolling bodies, one of said members is operated on by said wave generator, in at least one of the other members said groove is a periodically bent endless one with the direction of bending being in agreement with a direction of the wave generator's force on the rolling bodies, said gear-bearing differential speed transducer characterized in that the torque transmitting unit includes at least three of the members each embodied in the form of a cage, each cage coaxial to the other cages, each of said cages conjugated with two adjacent cages, and at least two of said cages conjugated by their intersecting surfaces, said grooves located at said intersecting surfaces so that all of the cages are conjugated each with each other around the rolling bodies.

17. A gear-bearing differential speed transducer on basis of wave gear with intermediate rolling bodies, said speed transducer comprising:

a wave generator, the wave generator operating on one cage or a torque transmitting unit;

the torque transmitting unit including at least three cooperating cages, each of the cages having a profile cam surface in the form of a periodic groove along the azimuth, with at least one of the periodic grooves on the cages being an endless groove;

all of the cages arranged relative to each other so that each cage is conjugated with two adjacent cages, and at least two of the cages are conjugated by their intersecting surfaces; and a file of the intermediate rolling bodies continuously interacting with each of the periodic grooves, with the direction of bending of the at least one endless groove being in a direction of force of the wave generator to the rolling bodies, the periodic grooves being located at the intersecting surfaces, so that all cages are conjugated to each other around the rolling bodies.

* * * * *

UNITED STATES PATENT AND TRADEMARK OFFICE
CERTIFICATE OF CORRECTION

PATENT NO. : 7,241,245 B2
APPLICATION NO. : 10/482893
DATED : July 10, 2007
INVENTOR(S) : Viktor V. Stanovskoy et al.

It is certified that error appears in the above-identified patent and that said Letters Patent is hereby corrected as shown below:

In Col. 12, line 67, replace the phrase "and any endless periodic grooves of the resi of" with --and any endless periodic grooves of the rest of--.

In Col. 14, line 11, replace the phrase "the cage member counted to" with --the cage member coupled to--.

In Col. 14, line 49, replace the phrase "cage or a torque transmitting unit;" with --cage of a torque transmitting unit;--.

Signed and Sealed this

Twenty-eighth Day of August, 2007

JON W. DUDAS
*Director of the United States Patent and Trademark Office*